(12) United States Patent
Travis et al.

(10) Patent No.: US 11,194,969 B2
(45) Date of Patent: Dec. 7, 2021

(54) MANAGING DIALOG COMMENTS

(71) Applicant: INTERNATIONAL BUSINESS MACHINES CORPORATION, Armonk, NY (US)

(72) Inventors: Amy Travis, Arlington, MA (US); Liam Harpur, Dublin (IE); Rogelio Vazquez-Rivera, Acton, MA (US); Jonathan Dunne, Dungarvan (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 198 days.

(21) Appl. No.: 16/264,563

(22) Filed: Jan. 31, 2019

(65) Prior Publication Data

US 2020/0250268 A1 Aug. 6, 2020

(51) Int. Cl.
*G06F 40/30* (2020.01)
*H04L 29/08* (2006.01)

(52) U.S. Cl.
CPC .............. *G06F 40/30* (2020.01); *H04L 67/10* (2013.01)

(58) Field of Classification Search
CPC ......... H04L 51/02; H04L 51/32; H04L 51/16; H04L 51/34; G06F 40/35; G06F 16/3322; G06F 40/30
See application file for complete search history.

(56) References Cited

U.S. PATENT DOCUMENTS

| 9,141,695 | B2 | 9/2015 | Zureiqat | |
| 2014/0068437 | A1* | 3/2014 | Dedapper | H04L 65/40 715/719 |
| 2014/0379705 | A1 | 9/2014 | Zureiqat | |
| 2014/0301540 | A1* | 10/2014 | Skiba | G06F 40/40 379/265.07 |
| 2016/0182423 | A1 | 6/2016 | Tevosyan | |
| 2017/0134333 | A1 | 1/2017 | Peterson et al. | |
| 2017/0374072 | A1 | 8/2017 | Steinberg et al. | |

* cited by examiner

*Primary Examiner* — Thomas H Maung
(74) *Attorney, Agent, or Firm* — Griffiths & Seaton PLLC

(57) ABSTRACT

Various embodiments for managing dialog comments by a processor are provided. Each communication of a dialog communicated by one or more users using one of a plurality of applications may be monitored, tracked, and/or analyzed using a machine learning operation and/or a natural language processing operation. A topic trajectory of the dialog may be identified between one or more users using one of a plurality of applications. A selected comment submitted by the one or more users may be automatically transformed according to one or more corrective actions upon the selected communication deviating from the topic trajectory.

17 Claims, 8 Drawing Sheets

MANAGING DIALOG COMMENTS

BACKGROUND OF THE INVENTION

Field of the Invention

The present invention relates in general to computing systems, and more particularly, to various embodiments for managing dialog comments in a communication forum by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. Smartphones and other sophisticated devices that rest in the palm of a person's hand allow for the sharing of information between users in an increasingly user friendly and simple manner. The increasing complexity of society coupled with the evolution of technology continue to engender the sharing of a vast amount of information between people.

SUMMARY OF THE INVENTION

Various embodiments for managing dialog comments by a processor are provided. In one embodiment, by way of example only, a method for managing dialog comments in a communication forum, again by a processor, is provided. Each communication of a dialog communicated by one or more users using one of a plurality of applications may be monitored, tracked, and/or analyzed using a machine learning operation and/or a natural language processing operation. A topic trajectory of the dialog may be identified between one or more users using one of the plurality of applications. A selected comment submitted by the one or more users may be automatically transformed according to one or more corrective actions upon the selected communication deviating from the topic trajectory.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
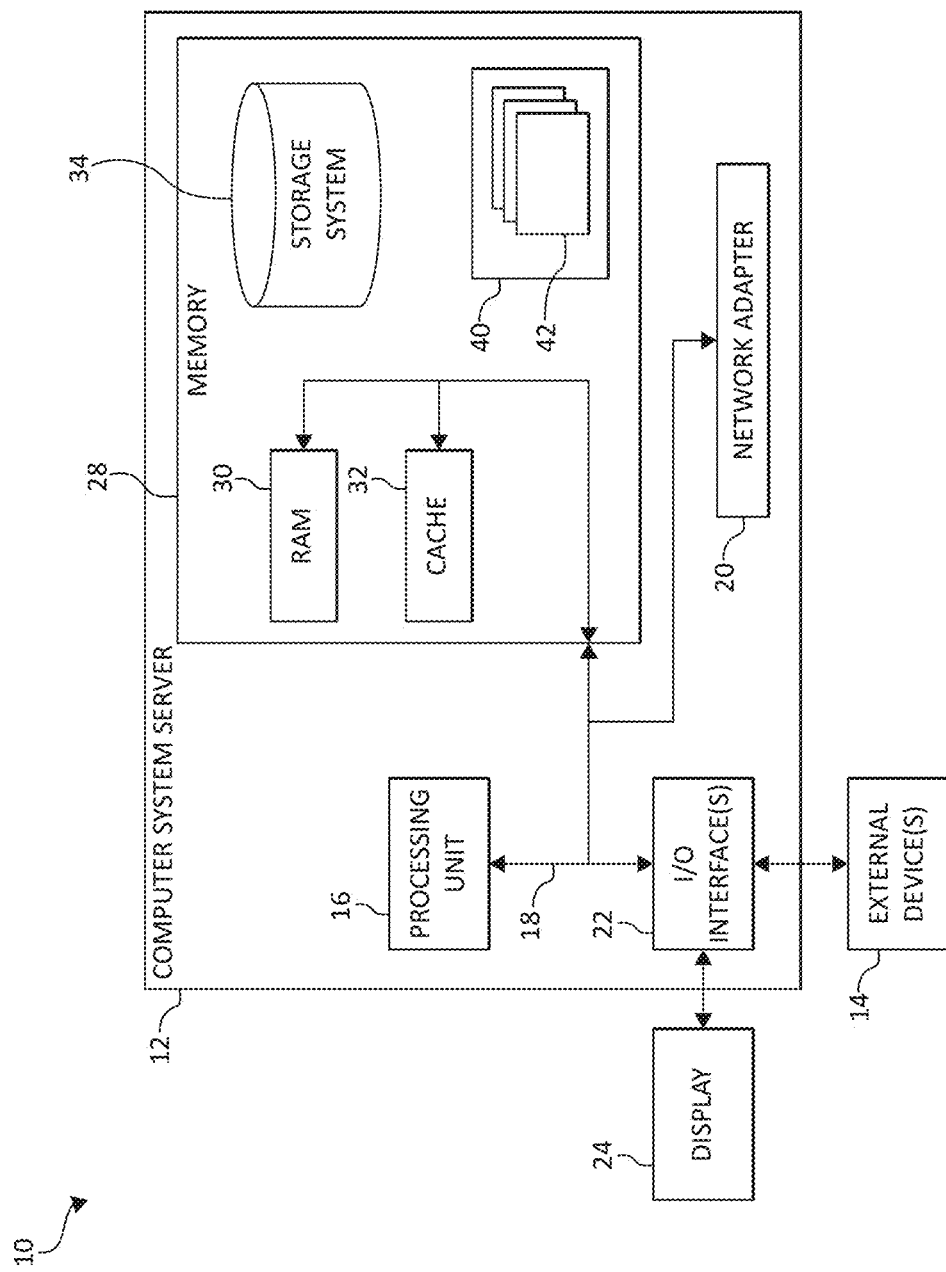
FIG. 1 is a block diagram depicting an exemplary cloud computing node according to an embodiment of the present invention.

With the advent of immediate, real-time communication made possible by smartphones and other devices, the proliferation of social media applications and other mechanisms having increased for people to use to share communication. Communications, such as emails, messages, speeches, social media posts, and other content may immediately become available in the public domain, and may remain in the public domain potentially indefinitely.

For content contributors, for example, the benefits of participating in social media have gone beyond simply social sharing, to building a person's reputation online, and bringing in career opportunities and monetary income. With the foregoing in mind, a user sharing communications, such as over social media, must consider the context of their communications and the implications of these communications. Along with the increased amount and ease of communication has come negative implications in some scenarios, as individuals have lost jobs, others have faced defamation litigation, brands have dropped endorsements of celebrities due to public statements, messages, speeches, or posts, and other implications for sharing communications that were later interpreted as inappropriate for a given context.

Comments can often lead to more off-hand commenting, ill-considered comments, or inappropriate comments according to the situation. This is related to the problem of "drive-by commenting" which may be a comment made by a user in a communication forum such as, for example, a social media post using a social media application about a controversial issue and the user may then turn off notifications so as not to get into a prolonged argument (e.g., I disagree with your meme on "topic A" because of reasons X, Y, and Z). Many individuals, teams, departments, and organizations wish to improve the problem of drive-by commenting. For example, an author may desire a group of users/persons to adequately interact with a selected thread and correlating communication posts to prevent users from submitting comments that do not benefit from a minimum consideration of the thread and its constituent members. Therefore, a need exists for a cognitive system that automatically manages that interaction and submission of comments to minimize drive-by commenting.

Accordingly, the present invention provides a cognitive system for managing dialog comments in a communication forum, again by a processor, is provided. Each communication of a dialog communicated by one or more users using one of a plurality of applications may be monitored, tracked, and/or analyzed using a machine learning operation and/or a natural language processing operation. A topic trajectory of the dialog may be identified between one or more users using one of a plurality of applications. A selected comment submitted by the one or more users may be automatically transformed according to one or more corrective actions upon the selected communication deviating from the topic trajectory.

In one aspect, the application of the cognitive system may be analogous to person A passing a group of people talking in the corridor. Person A uses their social awareness of the group talking to ascertain if the group can be interrupted, and if so, what level of interruption is reasonable. Likewise, the group provides visual/audio cues to others as to what the acceptable means of joining/interrupting/helping the group or conversation. For example, assume Person A knows by looking at the group if a statement can be provided or if Person A has to politely say "Hi" and listen for two minutes before commenting. In similar fashion, the cognitive system of the present invention provides indications/cues to each user and potential users of a dialog in a communication forum/social media platform of what may be performed. In one aspect, those ascertained cues may optionally be made a requirement in order to comment to the thread.

As used herein, the so-called "compliance" (e.g., appropriateness) of communication, such as a message, may be very subjective and context dependent. The same message may be interpreted and evaluated to be either fine, or "totally improper," or even "illegal" depending on who (subject) says to whom (object), when and where (context). In some cases, lack of cultural and/or legal knowledge, or even insufficient linguistic and/or worldly knowledge on the part of the person authoring and/or sending communication may cause irreparable damage.

Consider the following example. A comment by an employee about his low opinion of a competing company's product may be appropriate in a private setting between the employee and another employee, such as in a private series of conversations posted inside the company's intranet. However, the same comments about the competitor may be deemed to be disparaging, and perhaps inappropriate, when publicly posted in a social media setting.

The foregoing example illustrates that the content of communication itself may not be non-compliant; rather the context of the communication becomes important as questions of to whom the communication is directed, who the communication is from, who may view the communication, where the communication is sent, and when the communication is sent.

It may be acceptable to post, for example, caricatures of a political figure in one country, but in another country, such caricatures may be a criminal offense. Politically sensitive communications may be acceptable in a personal social media page or through personal emails, but may be inappropriate if shared through company forums, conference calls, emails, or using other corporate resources.

Accordingly, the so-called "compliance" of particular data/content may depend greatly upon contextual factors, such as a user profile, age/maturity levels, a type of media data, a health/emotion profile, emotional data, and other contextual factors and even a classification of media content. A deeper, cognitive analysis of the user and levels of the media data may be needed, for example based on standards, rules, policies, and practices in ethical, moral, as well as legal dimensions.

It should be noted that reference to calculating an 'interpreted non-compliance" (e.g., interpreted inappropriateness) against a predetermined threshold herein following may refer to implementations of a wide variety of metric analysis, data analytics, and other data processing as one of ordinary skill in the art will appreciate. For example, a predetermined threshold may be set as a numerical value, where certain kinds of communication are given certain weighted values, and an aggregate number of the weighted values is compared against the numerical threshold value. In other embodiments, a "most significant" aspect of the communication may be selected, given a weight or other metric value, and compared against a bar metric representative of the threshold.

In one embodiment, for example, communications may be organized into certain intensity levels, where a benign form of communication is assigned a lower intensity value, and where potentially offensive, illegal, or other generally hazardous communication is assigned a high intensity value. Here again, the communications may be examined in view of the context in which the communication is made, so that some communication may be assigned a higher intensity value in a certain context. One of ordinary skill in the art, however, will appreciate that any number of metrics may be implemented as a "threshold" comparison to accomplish the various aspects of the illustrated embodiments.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
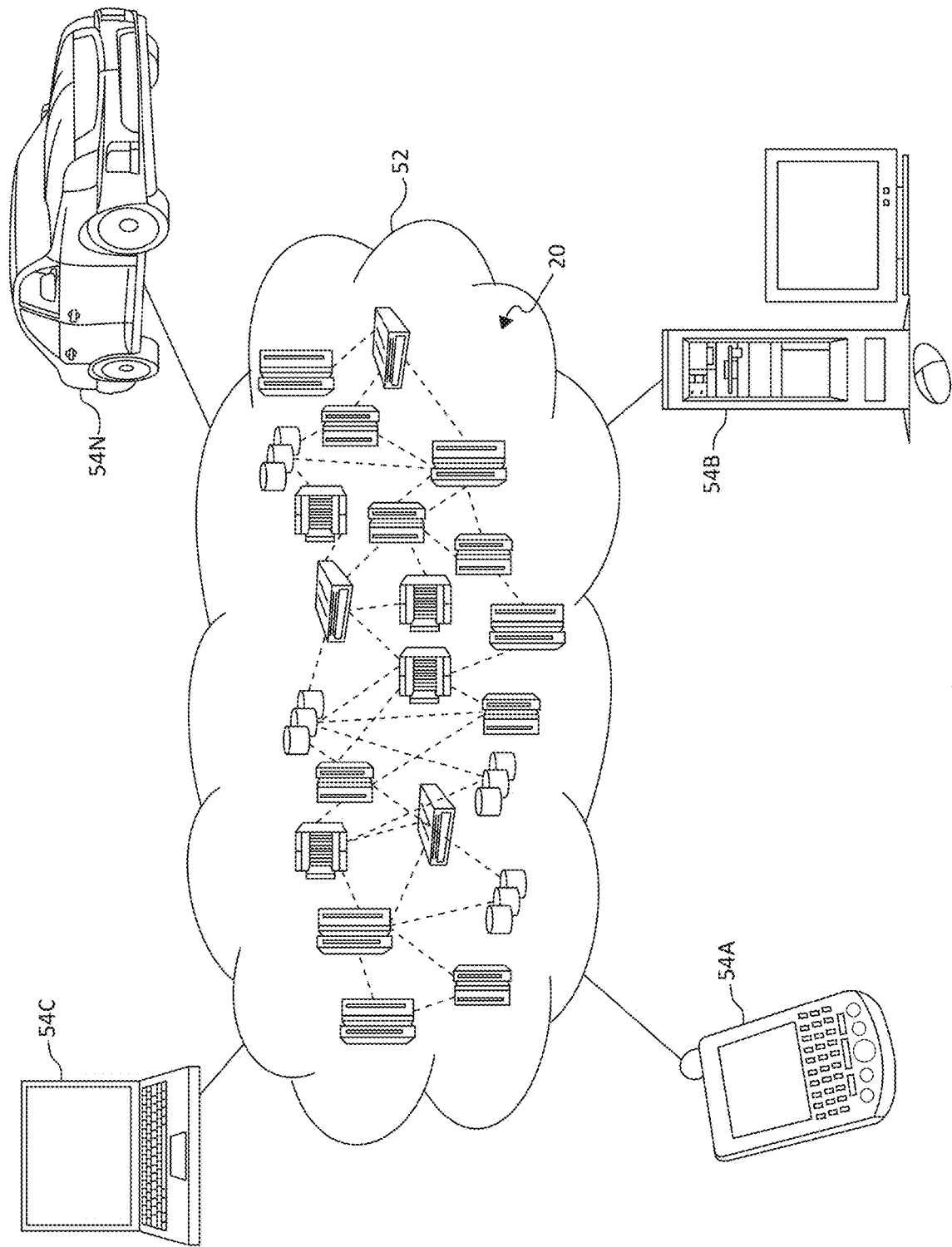
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
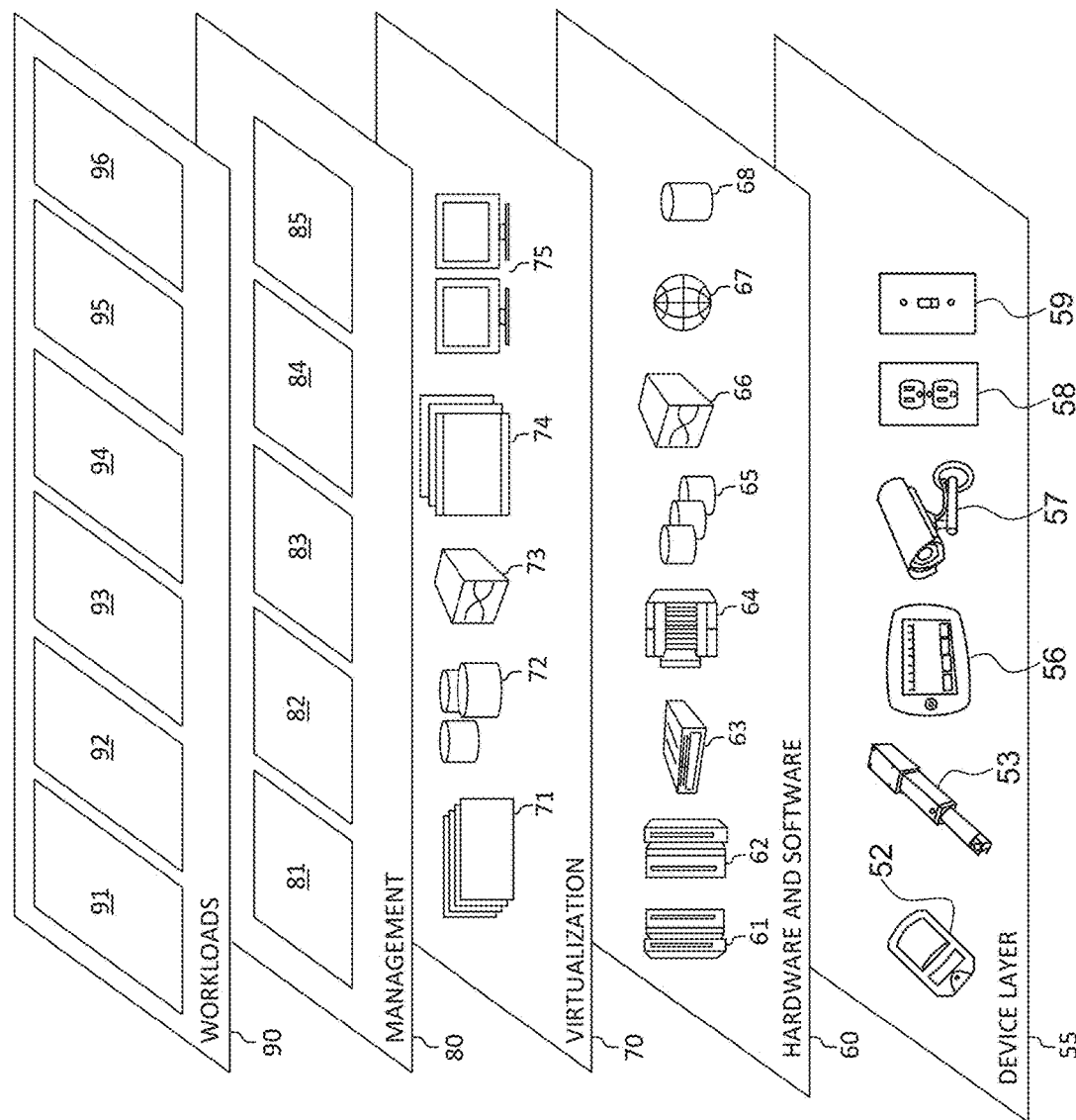
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing dialog comments. In addition, workloads and functions 96 for managing dialog comments may include such operations as data analytics, data analysis, and as will be further described, notification functionality. One of ordinary skill in the art will appreciate that the communication processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for managing dialog comments. Each communication of a dialog communicated by one or more users using one of a plurality of applications may be monitored, tracked, and/or analyzed using a machine learning operation and/or a natural language processing operation. A topic trajectory of the dialog may be identified between one or more users using one of a plurality of applications. A selected comment submitted by the one or more users may be automatically transformed according to one or more corrective actions upon the selected communication deviating from the topic trajectory.

Also, mechanisms of the illustrated embodiments may provide for changing commentary interaction behavior and involved users by determining the development/trajectory of group behavior in a group dialog for a given topic in a multi perspective thread for a location. In one aspect, the location may be a communication forum, social media application, a webpage/blog or geolocation. For example, commentary on thread X will be allowed if user A reads the commentary from group A, user B and User D in this thread Y because, the thread (or proximate threads) shows that is the minimum requirement for interaction is to "listen" to those users for 3 minutes. Meanwhile, user E is prohibited from engagement because user E did not meet those criteria. Thus, the present invention may provide for 1) determining a development/trajectory of group behaviors in a group dialog, 2) managing of a group of members of a dialogue based on the determined development/trajectory of group behaviors in the group dialog, and/or 3) providing visualization of that behavior to assist a social awareness for a selected user.

In one aspect, may provide a user interface (e.g., "UI") that that may be enabled to 1) suggest one or more required actions such as, for example, a required time to read previous comments/thread or a requirement to read specific responses to a thread that exhibit words/phrases that are in line with the thread (e.g., words/phrases matching/following an identified topic trajectory). Additionally, the present invention may suggest timelines for a comment insertion, suggest where the comment should be inserted in a communication thread, if possible, and/or suggest keywords to a commenter that would be identified as a valuable contribution to the thread.

User feedback may be provided through ranking contributions. Ranking contributions may refer to the ability to surface and/or provide a contribution in terms of a rank (i.e., an aggregate of likes/dislikes or up-votes compared to down-votes or in some embodiments an aggregate of a net promoter score). The present invention may be expanded to include social influences of one or more particular participants. For example, if a user with a high degree of social influence (e.g., a ranking, value, or scoring of a social media application or popular social, entertainment, cultural icon, etc.) or defined level of responsibility and/or authority of an entity (e.g., a manager of an organization) posts a particular response, the present invention may analyze, check, and/or determine that the particular post is read before other posts are made. For example, a vice president of a selected company having a defined level of importance or influence of an entity may communicate/post a response to a communication thread. The present invention may be enabled to ensure that that particular post (e.g., the subject/topic matter expert contribution is read prior to other threads being allowed to be posted). In one aspect, a mechanisms may be provided to determine if a user has complied with one or more prerequisites to contributing such as, for example, a series of queries related to a required thread to be read, a time period set prior to enablement of contribution, applying a machine learning operation/artificial intelligence ("AI") operation to identify the user has complied with the requisite or other action for proving compliance.

As an additional example, a user may be a contributor that comments end up as being "highly ranked" or "popular" in specific threads/topics (e.g., a subject matter expert). The comments made by that subject/topic matter expert contributor may include an additional weighted scoring/ranking component enabling the contributions of the subject/topic matter expert to be a must-read (e.g., a requirement that the contributions and prioritizing the contributions over other user's contributions. A scanning operation may be performed for identifying/looking for one or more triggers at a pre-defined interval. In one aspect, a trigger may be a threshold (e.g., a statistical threshold) that makes the content a "must read" such as, for example, "there is a 97% probability that user G is an expert on the current topic therefore the studied user should read that content.").

Figure 4:
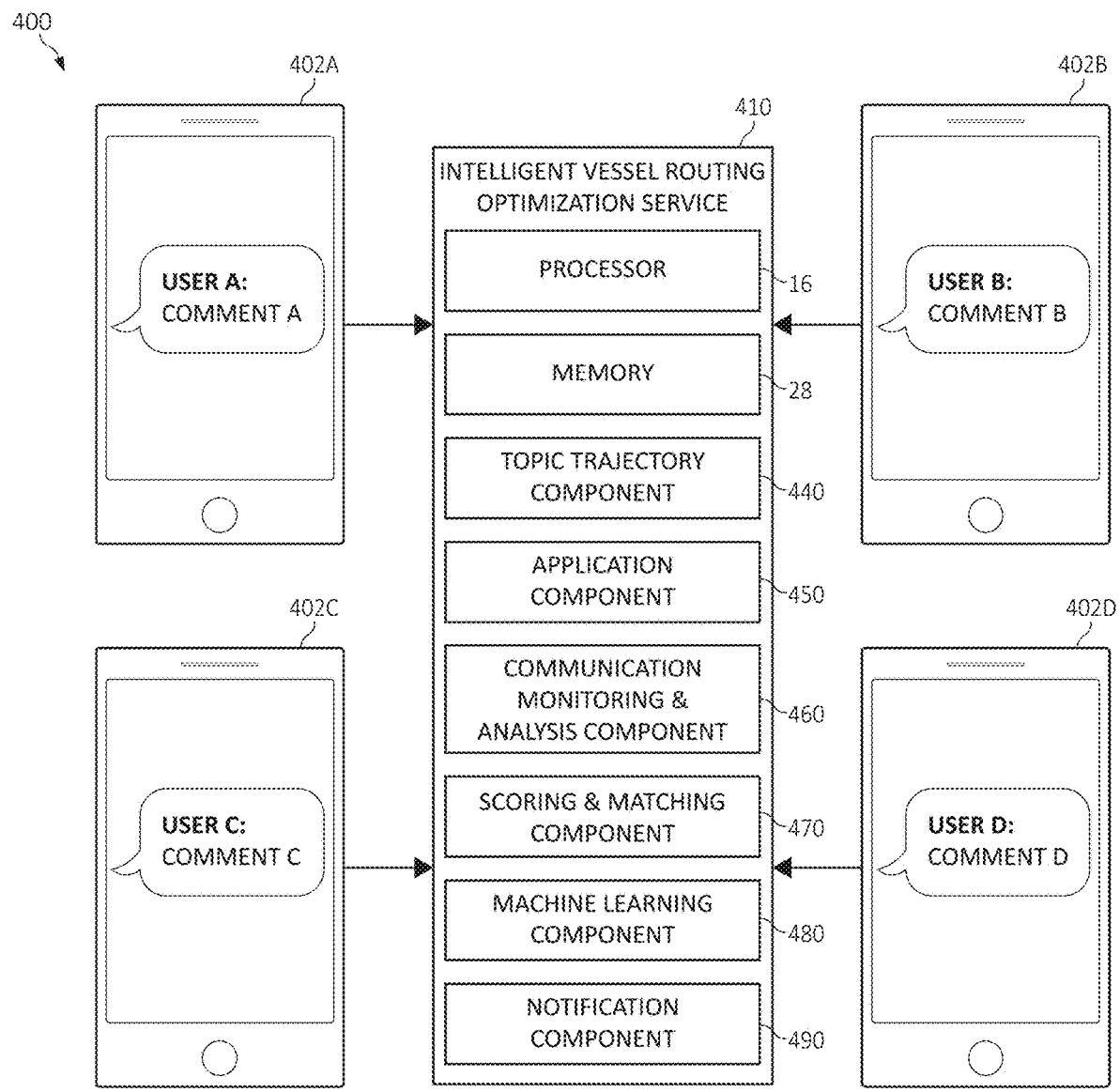
FIG. 4 is an additional block diagram depicting various user hardware and cloud computing components functioning in accordance with aspects of the present invention.

Turning now to FIG. 4 a block diagram depicting exemplary functional components 400 according to various mechanisms of the illustrated embodiments is shown. FIG. 4 illustrates systems 400 for intelligent communication message completion and correction in an IoT computing environment. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for cognitive data curation in accordance with the present invention. Many of the functional blocks 400 may execute as background processes on various components, either in distributed computing components, or on the user device, or elsewhere.

As illustrated in FIG. 4, intelligent communication management service 410 is shown, incorporating processing unit 16 ("processors) and memory 28 of FIG. 1 to perform various computational, data processing and other functionality in accordance with various aspects of the present invention. The intelligent communication management service 410 may be provided by the computer system/server 12 of FIG. 1.

As one of ordinary skill in the art will appreciate, the depiction of the various functional units in the intelligent communication management service 410 is for purposes of illustration, as the functional units may be located within the intelligent communication management service 410 or elsewhere within and/or between distributed computing components.

The intelligent communication management service 410 may be in communication with and/or association with one or more computing devices 402A-D (e.g., an internet of things "IoT" computing device such as, for example, a smartphone, smartwatch, desktop computer, laptop computer, tablet, and/or another electronic device that may have one or more processors and memory and configured for capturing images or video data). The computing devices 402A-D and the intelligent communication management service 410 may each be associated with and/or in communication with each other, by one or more communication methods, such as a computing network, wireless communication network, or other network means enabling communication.

In one aspect, the intelligent communication management service 410 may provide virtualized computing services (i.e., virtualized computing, virtualized storage, virtualized networking, etc.) to the one or more computing devices 402A-D. More specifically, the intelligent communication management service 410 may provide, and/or be included in, a virtualized computing, virtualized storage, virtualized networking and other virtualized services that are executing on a hardware substrate.

The intelligent communication management service 410 may also function as a database and/or service that may store, maintain, and update data, services, and/or resources internal to and/or external to a cloud computing environment such as described in FIG. 2. In one aspect, intelligent communication management service 410 may assist in providing access to and/or assist in performing one or more various types of data, services and/or resources. In one aspect, the intelligent communication management service 410 may provide a topic trajectory component 440, an application component 450, a communication monitoring and analysis component 460, a scoring and matching component 470, a machine learning component 480, and a notification component 490.

The application component 450 may open, initiate, and/or provide interactive capabilities (e.g., between the intelligent communication management service 410 and third party application provider, etc.) for one or more types of applications for communicating a message/communication to one or more users associated with the computing devices 402A-D. The applications of the application component 450 may be enabled to perform a multimedia messaging, Short Message Service ("SMS"), social networking (e.g., social media communication of a social media account), audio or video social network sharing, an Instant Messaging (IM), E-mail, or other peer-to-peer communication operations. In short, the application component 450 provides a variety of types of applications having a variety of types of communication features/functionality usable with the SMS, social media account, IM, E-mail, or other peer-to-peer communication applications.

The communication monitoring and analysis component 460, in association with the machine learning component 480 may monitor, track, match, and/or analyze each communication of the dialog communicated by the one or more users using the one of a plurality of applications one or more machine learning operations.

The communication monitoring and analysis component 460, in association with the machine learning component 480, may monitor, match, track, and/or analyze communication data (e.g., comment A from user A, comment B from user B, comment C from user C, and/or comment D from user D) using a machine learning operation and/or an NLP operation to identify a topic, communication behaviors, appropriateness/inappropriateness, keywords, phrases, media data (e.g., audio data and/or video data) or a combination thereof in a dialog using one or more machine learning operations. Moreover, the communication monitoring and analysis component 460 may also search one or more data sources (e.g., computing devices, video/image capturing devices, audio capturing devices, sensor-based devices, IoT computing devices, online data sources such as, a website, online journals, or social media accounts/networks).

The communication monitoring and analysis component 460, in association with the topic trajectory component 440, may interpret keywords, phrases, media data (e.g., audio data and/or video data), or one or more contextual factors relating to data in a communication prior to the user sending/updating the communication to an application (and/or may store the communication for analysis in a communication/ computing storage system prior to publication for the analyzing operations) to one or more persons using one of a plurality of applications.

The topic trajectory component 440 may identify a topic trajectory of a dialog between one or more users using one of a plurality of applications and automatically transform a selected comment submitted by the one or more users (e.g., comment A from user A, comment B from user B, comment C from user C, and/or comment D from user D) according to one or more corrective actions upon the selected communication deviating from the topic trajectory. For example, comment C from user C may be filtered, edited, and/or held in abeyance prior to publishing until user C complies with a particular course of action based on a comparison to the topic trajectory.

The topic trajectory component 440 may determine the topic trajectory by analyzing the dialog to identify and match topics, keywords, phrases, images, audio data, video data, or a combination thereof in the dialog using one or more machine learning operations.

The scoring and matching component 470 may assign a score (e.g., a confidence score) to each communication (and/or topic of each communication) indicating a degree of similarity to the topic trajectory. That is, the scoring component 402 may assign the confidence score for each of the one or more topic trajectory according a data used to generate the one or more topic trajectory. The scoring component 402 may rank each of the communications (or topics of the communications) according to a degree of similarity or matching with other communications and/or topics of the topic trajectory. The score may be an assigned value, a value within a range of values, a percentage, an assigned rank, a maximum likelihood estimation ("MLE") score, and/or other defined score in relation to content being compared (e.g., topic trajectory).

In association with the scoring, the scoring and matching component 470, in association with the machine learning component 480, may perform a matching each topic, keyword, phrase, image, audio data, video data, or a combination thereof in a communication with other topics, keywords, phrases, images, audio data, video data, or a combination thereof of other communications of the dialog. Thus, based on a degree or level of matching the topics, keywords, phrases, images, audio data, video data, or a combination thereof of one communication of one user to the other topics, keywords, phrases, images, audio data, video data, or a combination thereof already including in the dialog, a lower score or "non-matching" score is assigned indicating a level of deviations from the target trajectory. For example, a score that is less than a defined target trajectory threshold may indicate a deviation from the target trajectory. Alternatively, a score that is equal to and/or greater than the target trajectory indicates a level of compliance or similarity to the target trajectory. In one aspect, the target trajectory threshold may be a percentage, a defined value, and/or a value within a range of values. In an additional aspect, the topic trajectory component 440 may dynamically change the topic trajectory according to according communication interaction behavior of the one or more users in the dialog.

The notification component 490 may require, suggest, and/or instruct each of the one or more users to engage in one or more selected courses of actions (e.g., read other comments from previous communications threads prior to commenting in a current thread) prior to providing a communication in the dialog. The notification component 490 may also alert/notify each user of a change to the tropic trajectory. That is, devices 402A-402D may include a user interface ("UI") (e.g., an interactive graphical user interface "GUI") providing user interaction with one or more users such as, for example, users user A-D for receiving one or more inputs/entries into a communication dialog application/medium (e.g., forum, webpage, blog, chatroom, etc.). Also, the devices 402A-402D may be configured to receive one or more alerts as described herein.

The machine learning component 480, in association with the topic trajectory component 440, may be initialized to learn a topic trajectory according to current topics in each communication dialog and previous/historical communication dialogs. The machine learning component 480, in association with the topic trajectory component 440, may combine the learned communications and communication interaction behaviors user. The machine learning operations may include various AI instances. These AI instances may include IBM® Watson® Alchemy Language (IBM Watson and Alchemy are trademarks of International Business Machines Corporation).

It should be noted that, the machine learning component 480, using a machine learning operation, may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
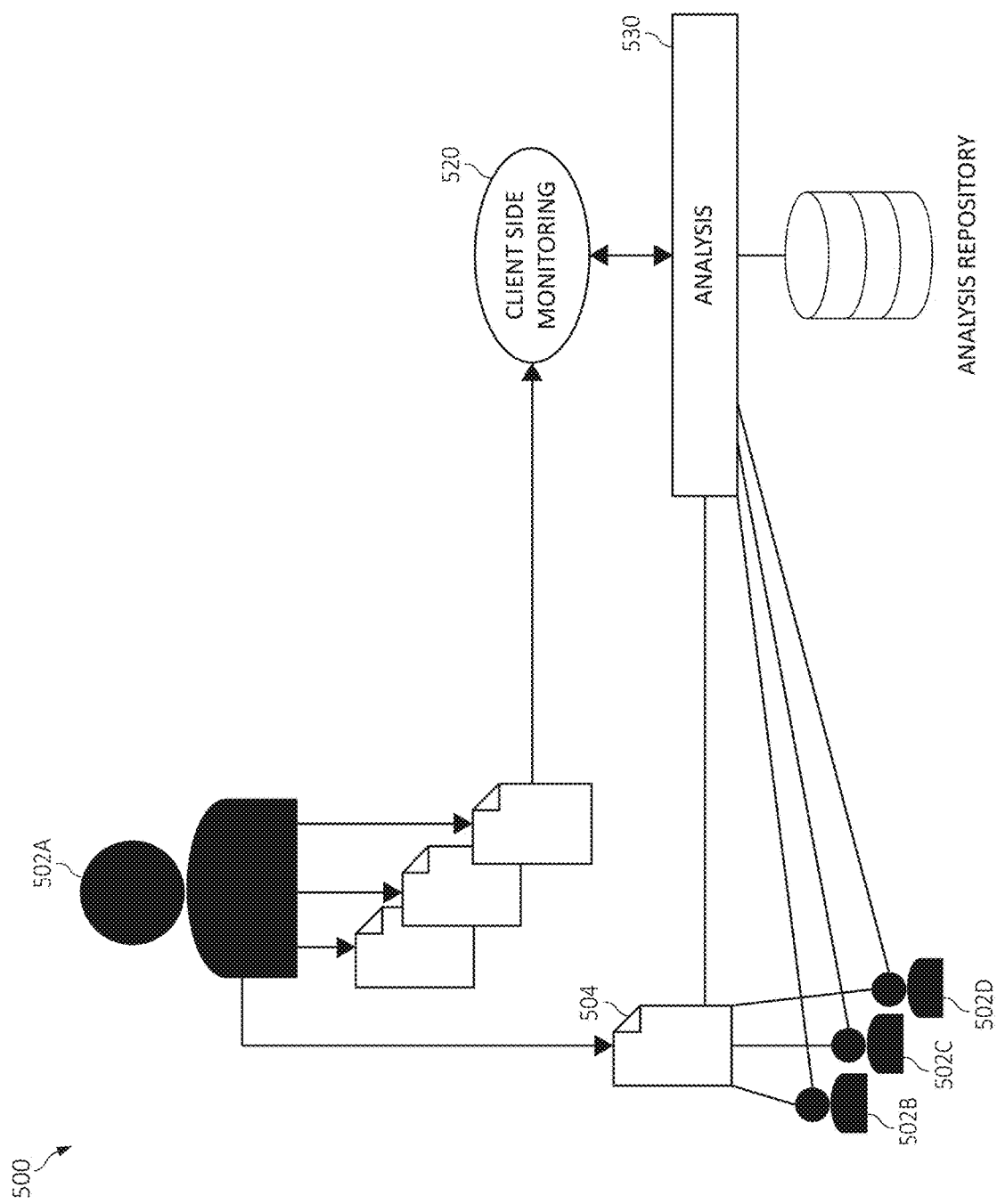
FIG. 5 is a block diagram illustrating an example of managing dialog comments in a communication forum in accordance with aspects of the present invention.

In view of the method 400 of FIG. 4, consider, as an illustration of exemplary functional blocks to accomplish various purposes of the present invention, FIG. 5, following. FIG. 5 illustrates these exemplary functional blocks 500 and associated notes on specific functionality (as denoted by the doted boxes). Each of the functional blocks 500 may be implemented in hardware and/or software, such as by the computer/server 12 (FIG. 1), and/or the workloads layer 90 (FIG. 3).

As depicted in FIG. 5, a block/flow diagram 500 depicts an example of managing dialog comments in a communication forum. To further illustrate the example of managing dialog comments in a communication forum in FIG. 5, consider this scenario. Assume a user 502A posts a communications/threads and specifies that the associated thread be managed using the present invention as described herein for managing "drive-by commentary." Assume a selected user (e.g., user 502B from a group of users 502B-D) is likely to annoy the other users 502C-D if a comment was provided/submitted without reading the other posts as required by a defined communication-posting requisite.

The user 502A may provide the communication thread (e.g., communication thread 540) that may be monitored via a monitoring system 510 (e.g., for client side monitoring). The monitoring system 510 may include an analysis operation using an analysis repository 530 of historical analysis data from previous analysis operations, as in block 520. The communication thread (e.g., communication thread 540) may be provided to a communication application/location (e.g., communication forum, blog, website, social media application, chatroom), etc.

Additionally, because the interaction between user 502C and user 502D shows signs of "listening" dialog required by a defined communication-posting requisites, such interaction influences and impacts the level of participation for user 502B in communication thread (e.g., communication thread 540). Similarly, a probability of one or more proceeding comments (e.g., comments/communications/threads 540, 542, 544, and/or 546) that have been valid (above a certain threshold of certainty) for drive-by commentary may be ascertained and optionally published. Any other likely outcomes from an initial statement of user 502A may be ascertained using one or more analytical/statistical operations (e.g., the system expects the development/trajectory of the following comments/communications/threads 540, 542, 544, and/or 546) to show a mirroring/symmetrical nature even though there are different persons/authors in the dialog).

In an additional aspect, the present invention may optionally ascertain the users/group (e.g., group 502A and 502C-D) that typically meet the published thresholds such that those users are encouraged to view and contribute to the thread (e.g., communications/threads 540, 542, 544, and/or 546). Such responses are useful for identifying and developing group cohesiveness by looking at a dataset to see statistically significant interaction behavior. This is also done by topic and optionally by each user (e.g., users 502A-D). The cognitive system of the present invention may notify the author (e.g., user 502A) of the original post or a prospective contributor (e.g., users 502B-D) if a proposed statement meets the threshold in that scenario.

The monitoring system 510 (e.g., for client side monitoring) may monitor the life-cycle of a thread (and proximate threads) such as, for example, communications/threads 540, 542, 544, and/or 546 over a selected time period for a given location (e.g., forum/community). The monitoring system 510 may including statistical keyword monitoring that correlates against clusters of selected/interested topics, words, phrases, sentences, etc., and can indicate if a topic should be provided group behavior analysis or if there should be limits on the commentary (e.g., because a topic on "gardening"

may not generate controversy (e.g., "heat") in conversations (see FIG. 7), that a thread may be made exempt from that process.

Additionally, the present invention may use one or more user measurement, user metrics, or end-user experience monitoring ("EUM") are employed to ascertain the read and interaction level of the user. In one aspect, this may be accomplished using various techniques at the client side (e.g., client side monitoring 510) using one or more various application, plugins, and/or local agents. Otherwise a user may provide a notification (e.g., a pop-up notification) to denote what is required for a communication thread.

Figure 6:
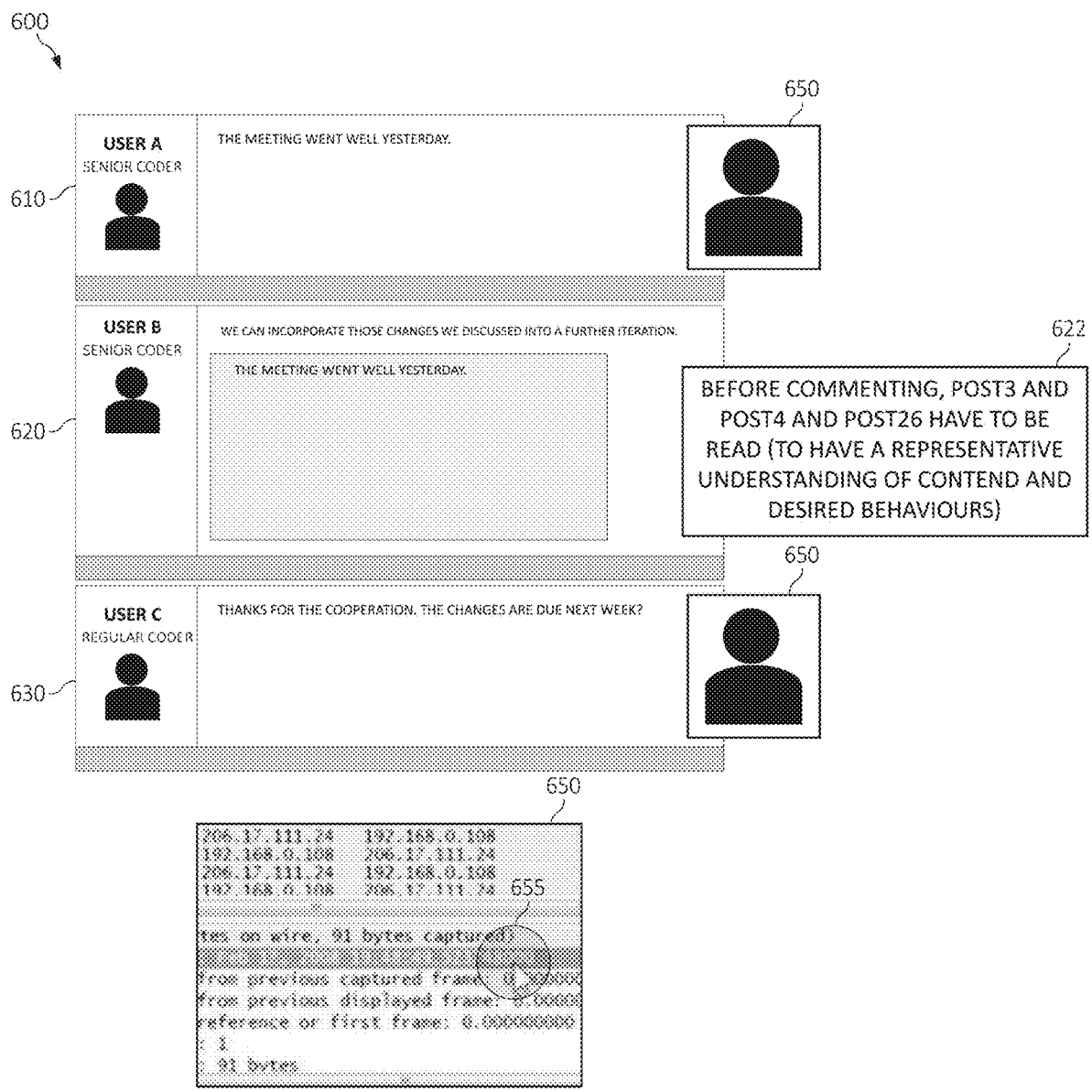
FIG. 6 is a diagram illustrating example conversations of a dialog in a communication forum in accordance with aspects of the present invention.

FIG. 6 is a diagram illustrating example conversations of a dialog in a communication forum 600. Also, one or more aspects of FIGS. 1-5 may also be included with and/or implemented with FIG. 6.

As depicted, the present invention may enable a computing device (e.g., a user interface "UI") to initiate a dialog conversation in the such as, for example, a dialog in the communication forum 600 where multiple communications/threads (e.g., communications/threads 610, 620, and/or 630) are provided. For example, the communications/threads 610, 620, and/or 630 may display a group of users 650 that resonates with a selected user and is representative of characteristics of the communications/threads 610, 620, and/or 630 (e.g., text section 622 may be used to enforce understanding of the offered group of users 650). For example, prior to being able to provide the communications/threads 610, 620, and/or 630, each user of the group of users 650 may be required to comply with the text section 622 may be used to enforce understanding of the offered group of users 650). For example, the text section 622 may require that each user (e.g., user 1 a senior coder or user 2 a regular coder) is require to read posts 3, 4, and 26 prior to commenting (so as to have a representative understanding of content and desired behaviors). It should be noted that in one aspect, each incoming communication such as, for example, at least a portion 655 of a communication (e.g., a portion 655 of communication 610) may be parsed to identify, for example, a time period 665 of the communication.

For example, commentary on communications/threads 610, 620, and/or 630 (by user 1 and user 2 who may be part of the group of users 650) may be allowed if each user complies with the representative of characteristics of the communications/threads 610, 620, and/or 630 (e.g., text section 622 may be used to enforce requirements and/or understanding of the offered group of users 650). The time period of each communication may be located and identified to determine if the communication has occurred, for example, prior to or after communications that may be required to read prior to commenting. For example, each new user in the group of users 650 may be required to "listen" (e.g., listen and/or read previous or current comments) of current users for a selected period of time (e.g., 3 minutes). The time period of a communication/comment may be tracked and compared with the required time requirements (e.g., the 3 minutes). Meanwhile, a new user to the group of users 650 may be prohibited from engagement because the user did not meet those criteria of text section 622. Thus, the present invention may provide for 1) determining a development/trajectory of group behaviors in a group dialog, 2) managing of a group of members of a dialogue based on the determined development/trajectory of group behaviors in the group dialog, and/or 3) providing visualization of that behavior to assist a social awareness for a selected user.

Figure 7:
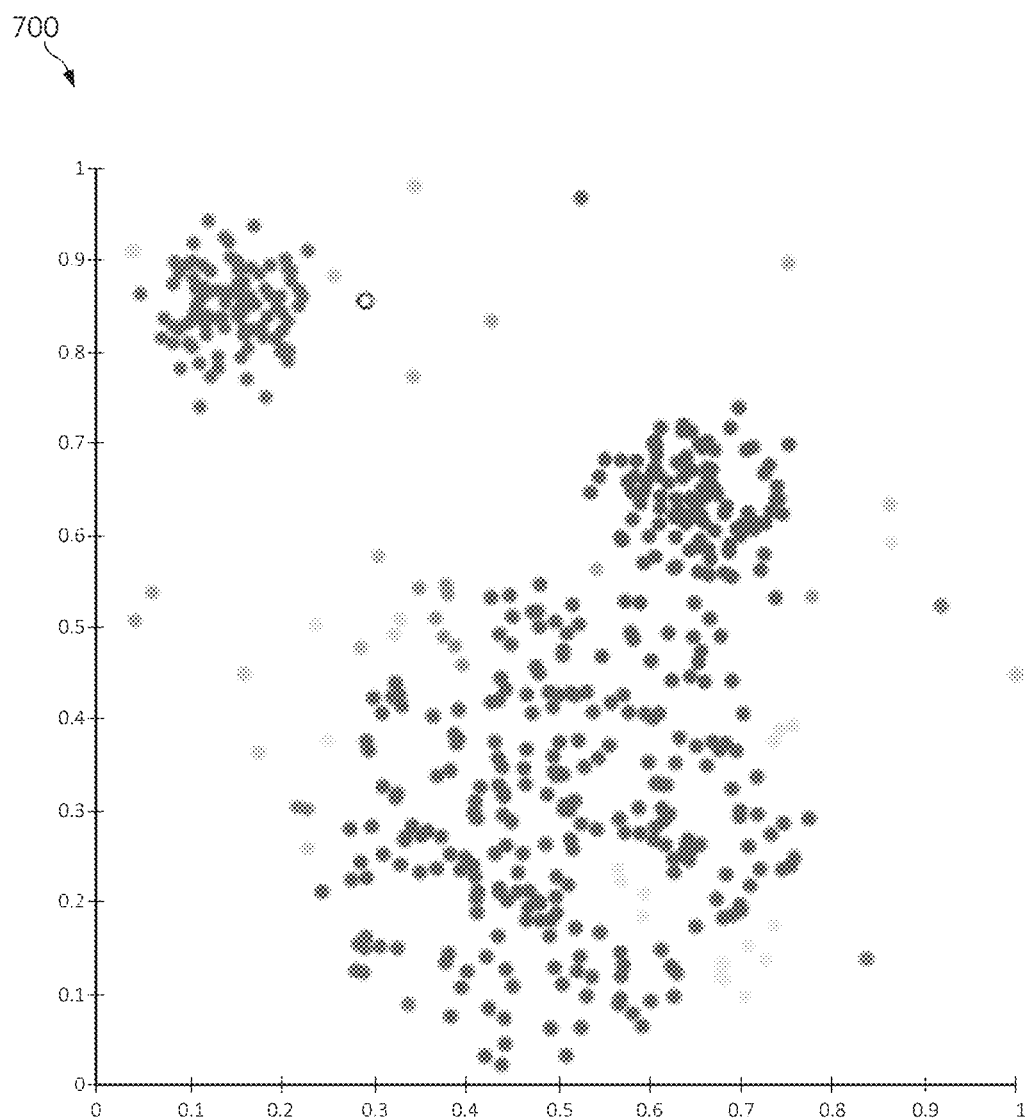
FIG. 7 is a graph diagram illustrating an example of topic trajectory distribution graph in accordance with aspects of the present invention.

FIG. 7 is a graph diagram 700 illustrating an example of topic trajectory distribution graph. Also, one or more aspects of FIGS. 1-6 may also be included with and/or implemented with FIG. 7. In one aspect, graph 700 depicts a normal distribution for a selected topic to identify a topic trajectory. For example, communications that match a similar topic may be clustered together as illustrated in graph diagram 700 for identifying topic trajectory. However, topic trajectories may follow other distribution types (i.e., lognormal distribution, Pareto, Weibull distribution, etc.). Similar topics may be clustered together to identify topics and topic trajectories. Darker shaded points on graph 700 may also indicated, in addition to the topics, topics that do not generate controversy (e.g., "heat"). Lighter shaded points on 700 may indicated controversial comments, random topics/comments, or other non-related comments to a particular cluster of topics/topic trajectories.

That is, the graph 700 is an output of a discriminant function model representing that there are populistic scales on both the X-axis and Y-axis and these scales are used to separate (probabilistically) topic comments such that there is a precise representation of 1) being more certain (e.g., a certainty above a selected threshold or percentage) of the outcomes of topics that contain higher p values scores, and 2) the values that tend towards the a selected area (e.g., a selected cluster of the shaded dots in the diagram—those dots between 0.3 and 0.8 on the X-axis and between 0 and 0.5 on the Y-axis) indicate a greater degree of controversy.

In another aspect, an NLP operation may be used to understand API processes the comments to understand the relationship/similarity of the proximate responses and also to visualize the time interaction trajectory of the statements, as illustrated in the follow pseudocode:

```
{"usage": {
    "text_units": 1,
    "text_characters": 68,
    "features": 8
},
"sentiment": {
    "document": {
    "score": 0,
    "label": "neutral"
    }
},
"semantic_roles": [
    {
    "subject": {
    "text": "font"
    },
    "sentence": "Hello, font is of different color in FF (black) and Chrome (greyish)",
    "object": {
```

```
    "text": "of different color in FF (black) and Chrome (greyish)"
   },
   "action": {
    "verb": {
     "text": "be",
     "tense": "present"
    },
    "text": "is",
    "normalized": "be"
   }
  }
 ],
 "relations": [ ],
 "language": "en",
 "keywords": [
  {
   "text": "different color",
   "relevance": 0.926946
  },
  {
   "text": "font",
   "relevance": 0.694486
  },
  {
   "text": "Chrome",
   "relevance": 0.666801
  }
 ],
 "entities": [ ],
 "emotion": {
  "document": {
   "emotion": {
    "sadness": 0.058571,
    "joy": 0.134982,
    "fear": 0.27891,
    "disgust": 0.010958,
    "anger": 0.030098
   }
  }
 },
 "concepts": [
  { "text": "Colorfulness",
    "relevance": 0.915757,
    "dbpedia_resource":
  }
 ], "categories": [
  {
   "score": 0.936949,
   "label": "/art and entertainment/visual art and design/design/interior design"
  },
  {
   "score": 0.171207,
   "label": "/art and entertainment/visual art and design/sculpture"
  },
  {
   "score": 0.102939,
   "label": "/art and entertainment/visual art and design/painting"
  }
 ]
}
```

Figure 8:
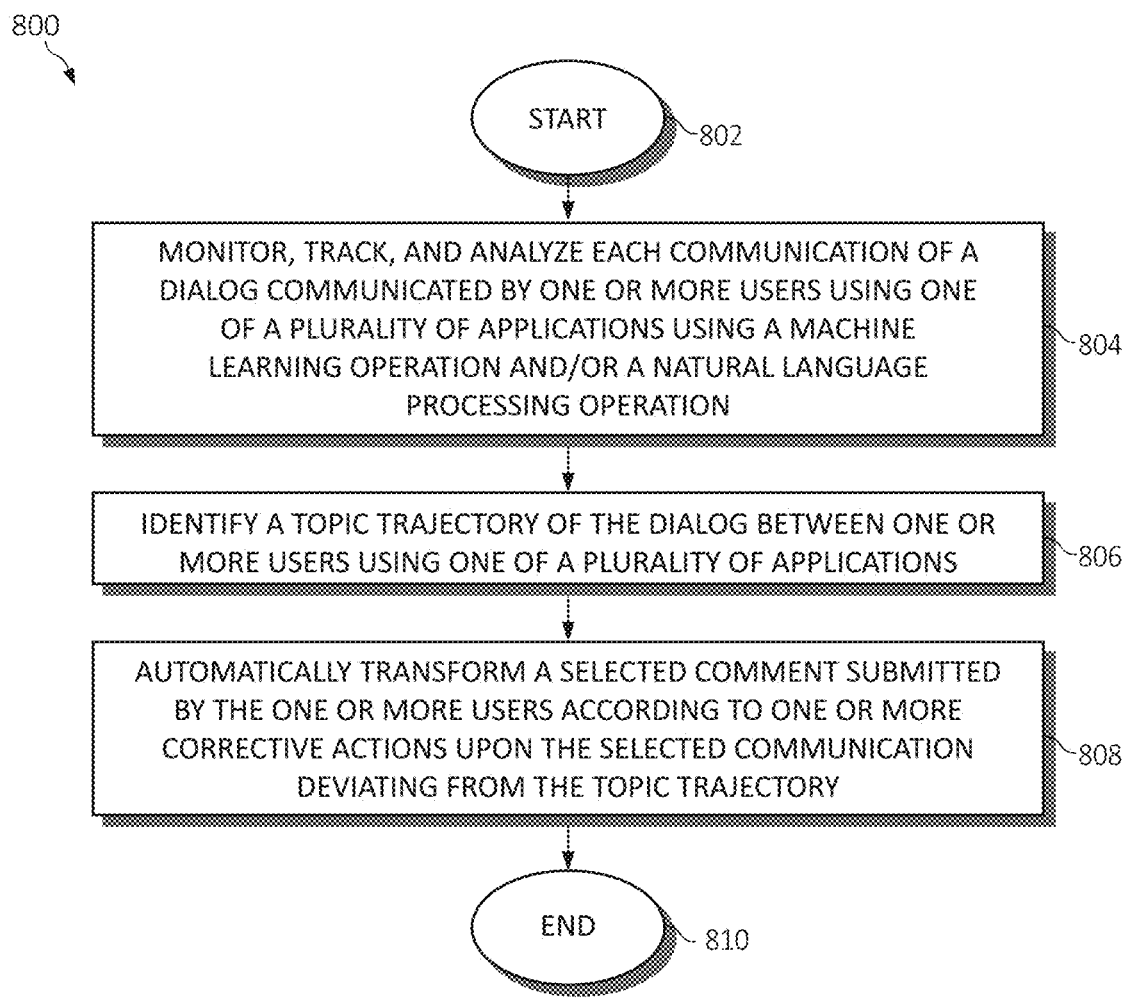
FIG. 8 is a flowchart diagram of an exemplary method for managing dialog comments (e.g., in a communication forum) in a computing environment in accordance with aspects of the present invention.

FIG. 8 is a flowchart diagram of an exemplary method for managing dialog comments (e.g., in a communication forum) in a computing environment. The blocks of functionality 800 may also be incorporated into various hardware and software components of FIGS. 1-6. The functionality 800 may be implemented as a method executed as instructions on a machine, where the instructions are included on at least one computer readable medium or one non-transitory machine-readable storage medium.

The functionality 800 may start in block 802. Each communication of a dialog communicated by one or more users using one of a plurality of applications may be monitored, tracked, and/or analyzed using a machine learning operation and/or a natural language processing operation, as in block 804. A topic trajectory of the dialog may be identified between one or more users using one of a plurality of applications, as in block 806. A selected comment submitted by the one or more users may be automatically transformed according to one or more corrective actions upon the selected communication deviating from the topic trajectory, as in block 808. The functionality 800 may end in block 810.

In one aspect, in conjunction with and/or as part of at least one block of FIG. 8, the operations of method 800 may include each of the following. The operations of method 800 may analyze text data, audio data, video data in each communication message using a machine learning operation and/or an NLP operation to identify a topic, conversational behavior, words, phrases, themes, or other type of communication data. The operations of method 800 may identify and/or interpret one or more contextual factors such as, for example, interpreting a tone, a sentiment, keywords, a type of text font, or a combination thereof in view of the communications.

The operations of method 800 may determine the topic trajectory by analyzing the dialog to identify and match topics, keywords, phrases, images, audio data, video data, or a combination thereof in the dialog using one or more machine learning operations. The operations of method 800 may assign a score to each communication by the user indicating a degree of similarity to the topic trajectory. The operations of method 800 may suggest each of the one or more users to engage in one or more selected courses of actions prior to providing a communication in the dialog. The operations of method 800 may dynamically change the topic trajectory according to according communication interaction behavior of the one or more users in the dialog. The operations of method 800 may alert the one or more users of a change to the tropic trajectory.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing dialog comments in a computing environment by a processor, comprising:
monitoring and tracking, by an application, communications within a dialog occurring between a plurality of users;
identifying a topic trajectory of the dialog between the plurality of users according to a contextual analyzation of the communications by the application;
receiving a communication submitted to the dialog by a new user to the plurality of users;
prior to displaying the submitted communication in the dialog, determining that the submitted communication is compliant with one or more compliance factors contextually associated with the topic trajectory of the dialog by comparing the submitted communication to a predetermined compliance threshold, wherein determining the submitted communication is compliant includes identifying that the new user has read those of the communications submitted to the dialog and any applicable portions of proximate dialogs of alternative dialog threads to the dialog submitted to the alternative dialog threads by a predefined group of the plurality of users; and
automatically displaying the submitted communication in the dialog upon determining that the submitted communication is compliant with the one or more compliance factors, wherein the submitted communication is restricted from being displayed upon determining that the new user failed to read those of the communications submitted to the dialog and failed to read the applicable portions of proximate dialogs of the alternative dialog threads to the dialog submitted by the predefined group of the plurality of users, as requisitely defined for eligibility to display the submitted communication within the dialog.

2. The method of claim 1, further including determining the topic trajectory by analyzing the dialog to identify and match topics, keywords, phrases, images, audio data, video data, or a combination thereof in the dialog using one or more machine learning operations.

3. The method of claim 1, further including assigning a score to the submitted communication indicating a degree of similarity to the topic trajectory.

4. The method of claim 1, further including suggesting each of the plurality of users engage in one or more selected courses of actions prior to providing a communication in the dialog.

5. The method of claim 1, further including dynamically changing the topic trajectory according to communication interaction behavior of the plurality of users in the dialog.

6. The method of claim 1, further including alerting the plurality of users of a change to the topic trajectory.

7. A system for managing dialog comments, comprising:
one or more computers with executable instructions that when executed cause the system to:
monitor and track, by an application, communications within a dialog occurring between a plurality of users;
identify a topic trajectory of the dialog between the plurality of users according to a contextual analyzation of the communications by the application;
receive a communication submitted to the dialog by a new user to the plurality of users;
prior to displaying the submitted communication in the dialog, determine that the submitted communication is compliant with one or more compliance factors contextually associated with the topic trajectory of the dialog by comparing the submitted communication to a predetermined compliance threshold, wherein determining the submitted communication is compliant includes identifying that the new user has read those of the communications submitted to the dialog and any applicable portions of proximate dialogs of alternative dialog threads to the dialog submitted to the alternative dialog threads by a predefined group of the plurality of users; and
automatically display the submitted communication in the dialog upon determining that the submitted communication is compliant with the one or more compliance factors, wherein the submitted communication is restricted from being displayed upon determining that the new user failed to read those of the communications submitted to the dialog and failed to read the applicable portions of proximate dialogs of the alternative dialog threads to the dialog submitted by the predefined group of the plurality of users, as requisitely defined for eligibility to display the submitted communication within the dialog.

8. The system of claim 7, wherein the executable instructions further determine the topic trajectory by analyzing the dialog to identify and match topics, keywords, phrases, images, audio data, video data, or a combination thereof in the dialog using one or more machine learning operations.

9. The system of claim 7, wherein the executable instructions further assign a score to the submitted communication indicating a degree of similarity to the topic trajectory.

10. The system of claim 7, wherein the executable instructions further suggest each of the plurality of users engage in one or more selected courses of actions prior to providing a communication in the dialog.

11. The system of claim 7, wherein the executable instructions further dynamically change the topic trajectory according to communication interaction behavior of the plurality of users in the dialog.

12. The system of claim 7, wherein the executable instructions further alert the plurality of users of a change to the topic trajectory.

13. A computer program product for managing dialog comments by a processor, the computer program product comprising a non-transitory computer-readable storage medium having computer-readable program code portions stored therein, the computer-readable program code portions comprising:
an executable portion that monitors and tracks, by an application, communications within a dialog occurring between a plurality of users;

an executable portion that identifies a topic trajectory of the dialog between the on plurality of users according to a contextual analyzation of the communications by the application;

an executable portion that receives a communication submitted to the dialog by a new user to the plurality of users;

an executable portion that, prior to displaying the submitted communication in the dialog, determines that the submitted communication is compliant with one or more compliance factors contextually associated with the topic trajectory of the dialog by comparing the submitted communication to a predetermined compliance threshold, wherein determining the submitted communication is compliant includes identifying that the new user has read those of the communications submitted to the dialog and any applicable portions of proximate dialogs of alternative dialog threads to the dialog submitted to the alternative dialog threads by a predefined group of the plurality of users; and an executable portion that automatically displays the submitted communication in the dialog upon determining that the submitted communication is compliant with the one or more compliance factors, wherein the submitted communication is restricted from being displayed upon determining that the new user failed to read those of the communications submitted to the dialog and failed to read the applicable portions of proximate dialogs of the alternative dialog threads to the dialog submitted by the predefined group of the plurality of users, as requisitely defined for eligibility to display the submitted communication within the dialog.

14. The computer program product of claim 13, further including an executable portion that determines the topic trajectory by analyzing the dialog to identify and match topics, keywords, phrases, images, audio data, video data, or a combination thereof in the dialog using one or more machine learning operations.

15. The computer program product of claim 13, further including an executable portion that assigns a score to the submitted communication indicating a degree of similarity to the topic trajectory.

16. The computer program product of claim 13, further including an executable portion that suggests each of the plurality of users engage in one or more selected courses of actions prior to providing a communication in the dialog.

17. The computer program product of claim 13, further including an executable portion that:
dynamically changes topic trajectory according to communication interaction behavior of the plurality of users in the dialog; and
alerts the plurality of users of a change to the topic trajectory.

* * * * *